INVENTOR
M. R. SCHROEDER
BY A. E. Hirsch Jr.
ATTORNEY

NONSYNCHRONOUS TIME-FREQUENCY MULTIPLEX TRANSMISSION SYSTEM

Filed Jan. 4, 1960 3 Sheets-Sheet 2

INVENTOR
M. R. SCHROEDER
BY C. E. Hirsch Jr.
ATTORNEY

Dec. 8, 1964 M. R. SCHROEDER 3,160,711
NONSYNCHRONOUS TIME-FREQUENCY MULTIPLEX TRANSMISSION SYSTEM
Filed Jan. 4, 1960 3 Sheets-Sheet 3

INVENTOR
M. R. SCHROEDER
BY
C. E. Hirsch Jr.
ATTORNEY

United States Patent Office 3,160,711
Patented Dec. 8, 1964

3,160,711
NONSYNCHRONOUS TIME-FREQUENCY MULTIPLEX TRANSMISSION SYSTEM

Manfred R. Schroeder, Gillette, N.J., assignor to Bell Telephone Laboratories, Incorporated, New York, N.Y., a corporation of New York
Filed June 4, 1960, Ser. No. 345
9 Claims. (Cl. 179—15)

This invention relates to multiplex communication, and particularly to an improved time division multiplex system of elastic channel capacity.

Time division multiplex communication systems as they are presently known fall into several classes. Of these, the so-called fully synchronous system is well known. It involves, at a transmitter station, a system in which all of the incoming lines, e.g., telephone transmitters, are sampled in rotation, and in which the samples are transmitted in time sequence over a common medium to a receiver station. At the receiver station, the samples are distributed to the telephone receivers for which they are intended by a distributor which operates in synchronism and in phase with the sampler. To avoid the complexities of the distributor apparatus at the receiver, so-called semisynchronous systems have been proposed in which each speech sample itself bears an identifying label in the form of some distinguishing characteristic; i.e., the speech sample bears its own address. Sorting is then accomplished at the receiver station by way of suitable recognition apparatus, each receiver accepting only those speech samples which are intended for it and rejecting those intended for other receivers.

Because the several channels to be transmitted are sampled in cyclic serial order, the semisynchronous systems, like the fully synchronous ones, require that all of the transmitters which make up the system shall be interdependent, at least as far as sampling is concerned. On the transmission medium the pulses of the outgoing train fall into definite time slots. When all of the available time slots are occupied, the capacity of the system is filled, and temporary idleness of any particular time slot does not make it available to a transmitter other than the one to which it has been assigned.

In systems of yet another class, the so-called non-synchronous class, the transmitters are not intercoupled by a central sampling agency but, to the contrary, are independent of one another except insofar as each transmitter applies to the signal which it transmits some characteristic which uniquely identifies the receiver for which it is destined. Systems of this class have been proposed in which there is assigned to each of the several substations, as the characteristic which identifies it, a specific pulse rate, and in which any transmitter desiring to communicate with a receiver to which each pulse rate has been assigned employs this pulse rate in transmitting. A sufficiently long sequence of the pulses of the outgoing train on the medium bears their address in the form of this assigned pulsing frequency, while the information of the message is carried by some appropriate form of modulation. Such a system is extremely flexible as to channel capacity since a new transmitter and a new receiver may be added at any time, as long as the new assigned pulse rate is within the carrying capacity of the transmission medium. On the other hand, such a system is wasteful of frequency space, because a substantial separation is required between the pulse rates of adjacent channels. Were it not for this, there would be periods during which the pulses of one channel would appear to have the same recurrence rate as the pulses of another channel, and the resulting interference between them would be intolerable.

An example of nonsynchronous class of time division multiplex transmission is represented by J. R. Pierce Patent 2,719,188, granted September 27, 1955. In the Pierce system, the message originating at each of a large number of transmitters is sampled at a sequence of randomly recurring instants. The time interval after which each sampling pulse follows its predecessor is, by and large, sufficiently short to meet the fundamental requirement of a time division multiplex system, i.e., not more more than one-half the period of the higher signal frequency component to be transmitted. Nevertheless, the time intervals are erratic, and the sampling pulses which they separate occur erratically, though frequently. The erratic pulse sources of the several transmitters may be alike or different. The message itself is imposed on the pulse groups in any desired fashion, for example, by frequency modulating a carrier of which the pulse is the envelope. Further, the outgoing pulse groups intended for a particular receiver are generally given an identifying characteristic such as, for example, a pulse time code. When the appropriately coded pulse group reaches the receiver it is recognized as such, accepted, demodulated, and reproduced while a differently coded pulse group is rejected.

The separation of one pulse group from all others at a receiver station is possible, theoretically at least, in systems of this type (Pierce and similar systems) by noting the timing arrangement or order of the incoming pulse groups. However, a fundamental problem in pulse modulation systems is transmission distortion of pulses by system imperfections such as phase or gain deviations, and more importantly, by multipath or reflection effects which may give rise to excessive interference between pulses, erratic timing of pulses, and resultant cross-talk noise or errors in reception, depending on the type of system. Because of such interference, characteristic distortion limits the number of pulse amplitudes permissible in the transmission of information or messages over a given channel and, in systems employing only two pulse amplitudes, may reduce the rate at which pulses can be transmitted. It thus places a limitation on channel capacity which, unlike signal distortion by noise, cannot be overcome by increasing signal power.

Thus, it often happens that the pulses of a group travel to the intended destination over several, sometimes many, different geometrical paths. The individual pulses arriving via one path may combine with the individual pulses of the same or a different pulse group arriving via a different path to produce, at a receiver station, a spurious pulse group which, if intended for that receiver, is improperly rejected or, if not destined for that receiver, is occasionally accepted. Multiple path reception is thus responsible for interference, particularly in the form of cross-talk. Moreover, in pulse modulation systems, pulses are transmitted in various combinations to form pulse trains and at the receiving end the envelope of the pulse train is examined to determine the amplitude of the transmitted pulses. As a result of pulse overlaps arising, for example, from multipath transmission effects and the like, there may be appreciable distortion of the pulse train envelope which may cause errors in reception or noise, depending upon the type of system.

Although there are times when the pulses originating at one transmitter in a fully nonsynchronous system coincide with those originating at another to produce a slight degradation of the desired message, nonetheless, there are always randomly located intervals in the pulse train in which some of the randomly timed pulses of still another transmitter may be inserted; hence the system may be said to be of "elastic" capacity. Because of multiple path reception however, the number of pulses simultaneously occupying the transmission medium is much higher than due solely to the primary or direct path message pulse groups. The number of transmitters that may simultaneously utilize the common medium is reduced accordingly and the elastic capacity of the system is curtailed.

The present invention deals with systems of the third or fully nonsynchronous class and has for its principal object the reduction of interchannel interference, particularly of interference arising from multiple path effects. A closely related object is to improve markedly the manner of addressing the individual message signals that are to be transmitted via a common medium for reception by one, and only one selected receiver.

These and other objects are obtained in accordance with the invention in the following manner. Both the transmission impairments or limitations imposed on transmission capacity discussed above, and excessive transmission distortion are overcome by altering, or modifying, the basic relations that exist between the impulse characteristic of the system and the envelope of the transmitted pulse train. In particular, the intervals of the pulses of the train are individually increased to an interval that substantially exceeds the impulse characteristic of the system. Consequently, the proportionate increase in the received pulse interval due, for example, to overlaps resulting from reflections and the like which alter the positions of the pulses and which are detected as distortions, is much less than it would be for a normally short pulse interval, i.e., for an interval that approximates the impulse response of an idealized unit pulse. An increase in the time interval alloted to the pulses requires, of course, more transmission time but in compensation the wide interval pulses may be transmitted over a proportionately narrower frequency band.

This fortuitous consequence is turned to account in the present invention in a manner that effectively obviates the need for an additional address code pulse, or the like, for addressing the individual pulse groups. Accordingly, the individual pulse groups are self-coded in a fashion that requires no additional channel bandwidth. This is accomplished by dividing the entire allotted channel into a number of frequency sub-bands each narrow enough that the multiple path response does not appreciably widen the impulse response of one sub-band. The individual pulses of each group are then transmitted from the transmitter station over a plurality of sub-bands which together make up the channel. Group addressing is achieved by selecting the sub-bands according to an established code. For example, the individual pulses may be simultaneously transmitted over selected frequency sub-bands. With this form of frequency division coding the address is specified by the number *m* out of *n* channels employed simultaneously to carry the pulse. Alternatively, the time sequence in which the pulses are transmitted within preestablished limits may be used to specify the address of the pulse group. Here the exact pulse time sequence is restored to its original scale at the receiver station so that the position of the individual pulses of the group exactly correspond to the positions of the pulses supplied to the transmitter. Preferably the two forms of address coding are employed together so that a great many pulse groups may be individually addressed without, however, requiring the use of an additional pulse or otherwise extending the frequency or time spectrum of the channel.

Address decoding at each receiver substation is accomplished by interrogating each received pulse for multiple coincidence among the sub-bands allotted to the substation as its individual address.

The invention will be fully apprehended by reference to the following detailed description of preferred embodiments thereof taken in connection with the appended drawings, in which.

Figure 1:
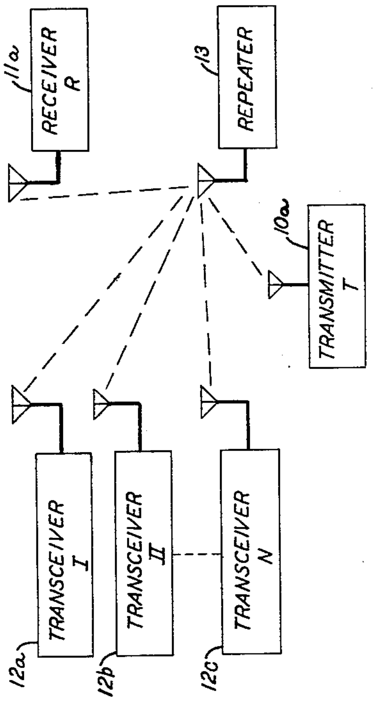
FIG. 1 is a pictorial representation showing the disposition of a plurality of subscriber substations embodying the invention and a repeater station that is common to them.

Referring now to FIG. 1 of the drawings, the present invention is particularly well adapted for use in a communication system formed by a number of message substations located apart from one another, each of which transmits and receives message signals nonsynchronously on a common frequency band. Each of the substations may be provided with transmitter apparatus 10, or receiver apparatus 11, or transceiver apparatus 12, i.e., both transmitter and receiver apparatus. Further, each of the substations may transmit on a common frequency and in a non-directional fashion to all other substations, but preferably each substation transmits on one common frequency directly to a central repeater station 13 and in turn receives on a second common frequency signals from other stations retransmitted non-directionally by the repeater station.

Before entering upon a detailed description of the apparatus of the invention and of the fashion in which it operates, it is advantageous first to establish an analytical foundation for the principles which it embodies.

Ideally, in a nonsynchronous time division multiplex transmission system only one receiver out of a large number of such receivers responds to each pulse group even though the consecutive (in time) pulse groups destined for a large number of independent receiver stations are nonsynchronously intercalated and transmitted in the common medium. There is no synchronization between any of the operations at any one station and any operation at any other station and yet independence of the conversations is completely maintained as though individual wires interconnected the stations by way of a central office; and this despite the fact that the system employs neither wire separation nor frequency separation but merely separation by the coding of the call numbers. However, because of multipath effects or the like, the coded information contained in each pulse group which identifies it, or the message information represented by the group, or both, may become obliterated during transmission so that the decoding operation, and in particular the address decoding operation, is made difficult.

An analysis of the impulse response characteristic of a typical transmission channel in relation to the corresponding characteristic of pulses transmitted therethrough is helpful in explaining how the effects of multipath overlap of pulses is successfully avoided in the present invention. Although the pulse transmission characteristic of a medium suffices for the determination of system performance, it is customary to relate it to the transmission frequency characteristic, that is, to the steady-state transmission response expressed as a function of frequency. For one thing, the transmission frequency characteristics of various existing facilities and their components are known, and for new facilities can be determined readily by calculation or by measurement. More fundamentally, however, the transmission frequency characteristics of various system components connected in various configurations can readily be combined to obtain the over-all transmission characteristic. It is thus possible to analyze complicated systems with the transmission frequency characteristic as a basic parameter and to specify requirements that must be imposed on the transmission frequency characteristic of the system and its components for a given transmission performance. This is not the case for "pulse transmission" characteristics.

The pulses arriving at a receiver station ordinarily differ in shape from the transmitted pulses because of bandwidth limitations, noise, multipath response effects and other system imperfections. The performance of the system in the absence of noise can be predicted if the pulse transmission characteristic is known, that is, the shape of a received pulse for a given applied pulse. In principle, the multipath response of a medium may be considered to be a special case of the impulse response of the system. Ordinarily the message signal is sampled only for very brief intervals and distinguishing features of the sample are represented by a sequence of pulses, e.g., binary pulses, whose dimensions closely approximate the impulse transmission characteristic of the common transmission channel. If, indeed, the code pulse intervals are sufficiently brief the corresponding frequency spectrum approximates the impulse response of the system.

Figure 2:
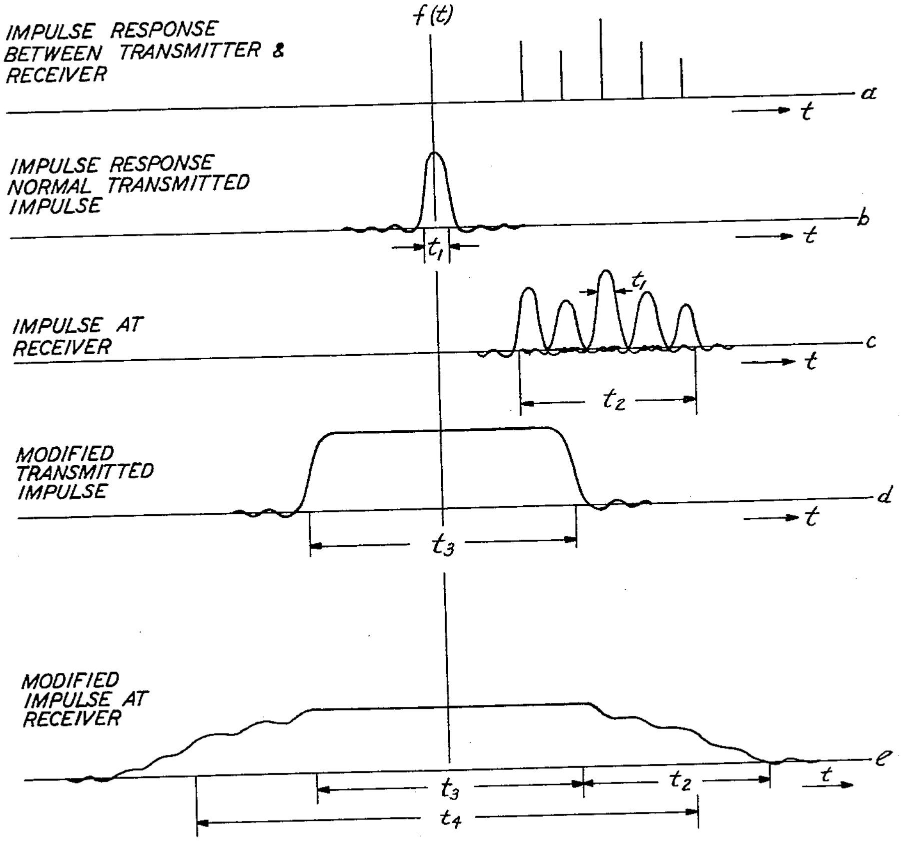
FIG. 2 is a group of wave form diagrams of assistance in explaining one of the principles of the invention.

Referring to FIG. 2, the impulse response of a transmission medium of given frequency and bandwidth is represented in the time domain ideally by a single pulse $f(t)$. Because of reflections during transmission and the like, which cause a transmitted signal to follow various paths to the receiver, the multipath response of the medium is represented by a series of short impulses of varying amplitudes randomly spaced along the time scale. A typical response is shown in line *a* of FIG. 2. The impulse response of a typically short interval pulse, on the other hand, is shown in line *b* of the figure. It exhibits the characteristic response of a unit pulse with a half power duration of $t_1$ and with lobes extending indefinitely on the time scale but with progressively decreasing amplitudes. If the pulse of line *b* is transmitted by way of a medium whose response is shown in line *a*, the response of the pulse recovered at a receiver station is a linear superposition of the response of the applied pulse and the impulse response of the medium. The process of defining as a new function an input function and the impulse response to which it is subjected is called convolution. The relation of the response of line *c* to that of lines *a* and *b* is evidently the convolution integral of the responses of lines *a* and *b*. Thus the convolution integral defines as a function of time the impulse response function multiplied by a typical element of the input function shifted or delayed according to the time of occurrence of that element. The resultant consists of a linear superposition of such delayed replicas of the impulse response weighted in magnitude by the input function. In effect, the shape of the impulse response of the applied pulse of line *b* is successively imprinted on the time scale at intervals specified by the response of the medium of line *a* with the magnitudes adjusted for each imprint according to the ordinates of the input function. The resulting envelope shown in line *c* has a finite period $t_2$ equal to the sum of the period of the impulse response and that of the impulse response of the medium.

The impulse response of a relatively wide pulse is shown in line *d* of FIG. 2. Its primary half power duration $t_3$ is substantially wider than $t_1$. The convolution of the wider pulse of line *d* with the impulse response of a transmission channel as shown in line *a* is once again of linear superposition of delayed replicas of the impulse response of the applied pulse suitably weighted in magnitude according to the channel response. The extent of the response $t_4$ obviously is very great. Under normal operating conditions it is sufficiently wide that small additional spreading due, for example, to multipath overlaps or additions is significantly smaller than the effective "ringing" of the channel, i.e., smaller than the breadth of the received pulse. Thus, so long as the medium rings for a substantially longer time than the impulse response of the system, regardless of the width of the pulses applied, the pulses out of the medium are increased only a few percent of the input width and hence any loss is but a small percentage of the total rather than a substantial percentage of the input pulse width. For a train of pulses, the over-all response is once again the input impulse convolved with the impulse response of the system. As expected the percentagewise susceptibility to multipath interference is proportionally reduced for the train. Although the foregoing analysis has assumed an input of base band pulses, similar considerations hold, of course, for relatively short bursts of radio frequency energy.

To summarize, if a very short pulse is considered, its extent on the time scale is the impulse response of the medium, but if a wider pulse is contemplated, not only is the response on the time scale increased by virtue of the increase in width of the input pulse, but it is increased also by an additional amount which is at least wide as the input response of the medium. For the wider pulse the percentage increase in time is small as compared with the increase due solely to an idealized pulse. Hence, the percentage-wise effect of the impulse response due to the wider pulses is small even although a longer time is required to transmit the pulses.

It is in accordance with the present invention to capitalize on this fortuitous situation by effectively widening each pulse of a coded pulse group generated at a transmitter station, e.g., transmitter 10, prior to transmission. Widening of the pulses overcomes degradation due to multipath effects and moreover permits the pulse groups to be transmitted over a substantially narrower frequency channel. However, since a specified number of pulses must be restricted to a relatively short time interval, a limit exists on the extent of pulse broadening. The limit is set in large measure by the pulse width for which the presence or absence of a pulse may be clearly determined in the presence of noise and interference.

Figure 3:
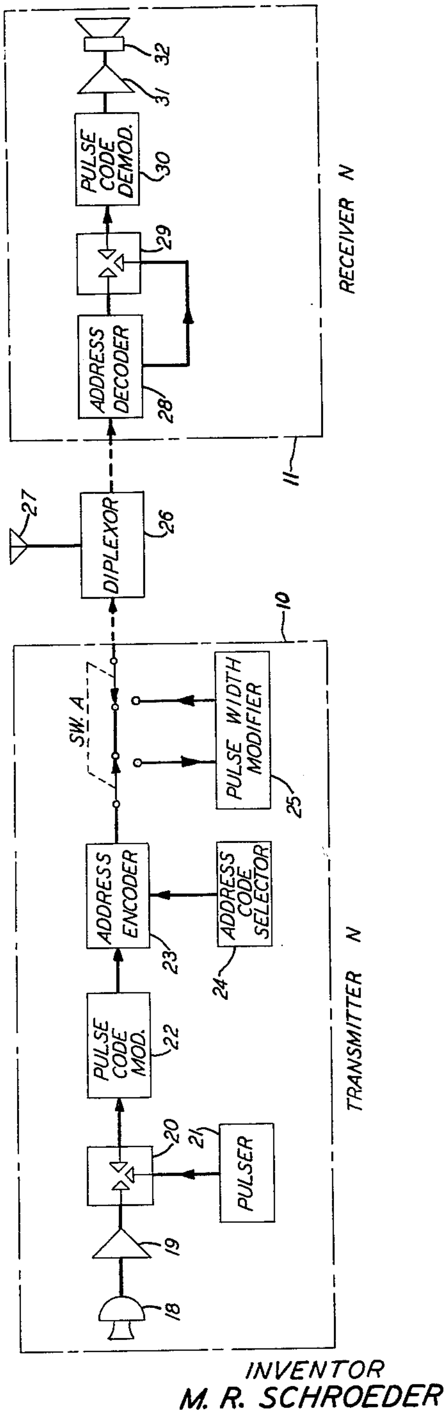
FIG. 3 is a schematic block diagram of transmitter and receiver apparatus embodied in any one of the substations of FIG. 1.

Referring now to the apparatus which turns these considerations to account, FIG. 3 shows transceiver station apparatus in accordance with the invention. The transmitter apparatus contained in each of the substations may be identical with that contained in all of the others in the group. The apparatus of FIG. 3 will be discussed by way of example as that of a substation N. At each transmitter 10 the gain of a message signal originating, for example, in a microphone 18 is suitably increased in amplifier 19 and sampled at a sequence of randomly recurring intervals. Sampler 20, which may be in the form of a gate circuit or the like, is actuated erratically by pulses supplied by pulse source 21.

Various sources of erratically spaced pulses are suitable for use in the practice of the invention. One suitable pulser is shown in the Pierce Patent 2,719,188. The only requirement for the pulse is that the average recurrence rate of the pulses be of the same general order of magnitude as the average rate at which the message wave is to be sampled. If pulse frequency modulation (PFM) is employed for encoding the message for transmission, erratic pulser 21 may be dispensed with since the code pulse groups produced in the modulation process are inherently nonsynchronous. In this case regularly recurring clock pulses may be used to sample the microphone signal.

Figure 6:
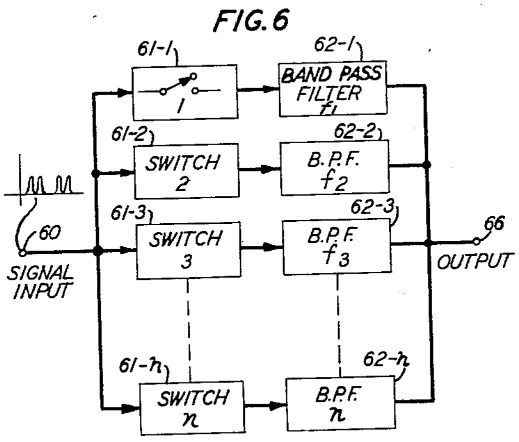
FIG. 6 is a schematic block diagram of address encoding apparatus suitable for use in transmitter apparatus constructed in accordance with the invention.
Figure 5:
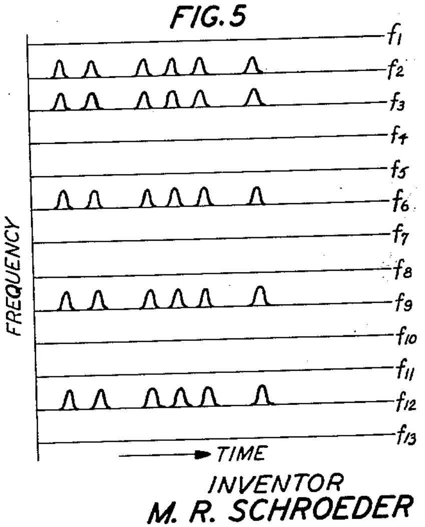
FIG. 5 is a graphic illustration of a frequency spectrum programmed to address signals generated by a transmitter in accordance with the invention.

A path is thus effectively established through the sampler to pulse code modulator 22. The modulator transforms the erratically spaced amplitude modulated pulses into any suitable form of coded signal. Preferably, the modulator codes each pulse by generating for it a code pulse group in which the deviation of the pulses of each group from a quiescent position indicates the amplitude of the corresponding pulse, i.e., it generates a pulse position modulation (PPM) signal. Alternatively, pulse frequency modulation (PFM), the effective inverse of pulse position modulation, may be used with the accompaniment of the above-mentioned advantage. Any form of pulse encoding apparatus, well known in the art, may be employed; it need not be described in detail here. The coded pulse groups are supplied to address encoder 23, wherein they are given an identifying characteristic sufficient to insure that they will be received by one and only one receiver. Address code selector 24, the structural and operational details of which will be described hereinafter in connection with FIGS. 5 and 6, is utilized to program the address encoder 23 with the address of the intended destination.

Signal samples generated by pulse code modulator 22 may be broadened in any one of a number of manners. For example, the pulse encoder 22 or the address encoder 23 may be arranged to produce relatively broad samples of the applied speech signal, in which case the pulses from encoder 23 are passed through switch A in the position shown directly to the transmitter output. Alternatively, normally short pulses may be produced by the encoders in which case switch A is connected to a second pair of terminals thus to shunt pulses passed by encoder 23 through pulse width modifier 25, wherein they are broadened, before supplying them to the output of the transmitter. Pulse broadeners which are adequate to perform this function are well known in the art and may take any desired form, e.g., a monostable multivibrator or the like may be used.

The fully addressed code pulse groups are transmitted by any means well known in the art. Thus, for example, code groups of relatively wide pulses may be transformed to a suitable radio frequency form, as for example in a modulator (not shown) and passed by way of diplexer 26 to antenna 27.

Figure 4:
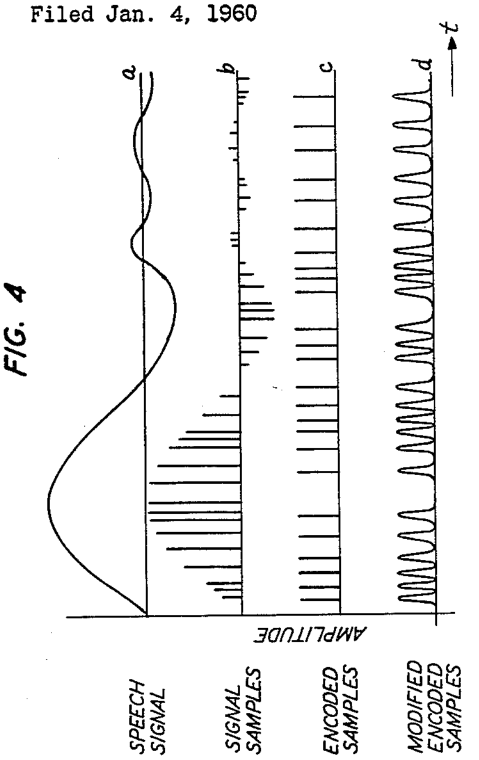
FIG. 4 is a group of wave form diagrams of assistance in explaining the operation of the transmitter apparatus of FIG. 3.

FIG. 4 illustrates various wave forms typical of those found in the transmitter apparatus of FIG. 3. A portion of a speech signal generated by microphone 18 is shown as a function of time in line *a*. Erratically spaced samples of the wave produced by sampler 20 are shown in line *b* and the encoded pulses produced by modulator 22 are illustrated in line *c*. Line *d* illustrates, by way of example, the encoded train of pulses of line *c* that have been suitably lengthened in accordance with the invention.

Although the individual pulses supplied by each transmitter substation are substantially wider than the effective multiple path response of the transmission channel and hence can be accommodated by much narrower bandwidth channel it is in accordance with the present invention to utilize the bandwidth of the available channel in its entirety in order to address each code pulse group. Thus, the nominally wide bandwidth channel is effectively divided into a number of frequency sub-bands each narrow enough that the multiple path response of the medium does not appreciably widen the impulse response of one sub-band. For example, the available channel bandwidth is effectively subdivided into thirteen equal bands, each sufficiently wide to accommodate the relatively wide pulses of each code pulse group. The individual pulses of the group are transmitted simultaneously over each of a selected group of sub-bands, e.g., five out of thirteen available ones, selected in accordance with the code address of the intended receiver. The address of each receiver is thus specified by a different combination of the five out of thirteen channels that are occupied by the speech pulses. The train of pulses in each channel also carry, of course, the message signal, as for example by the position of each pulse with regard to a quiescent position in time. Although the address may be specified by the simultaneous occupancy of $m$ out of $n$ channels, a five out of thirteen code allows the specification of $$\binom{13}{5}=1232$$

different addresses. If the channel is divided into twenty-six sub-bands and a coincidence of thirteen pulses out of the twenty-six is required to specify an address, the number of addresses is $$\binom{26}{13}=10{,}400{,}600$$

FIG. 5 illustrates graphically the distribution of encoded pulses addressed by frequency division coding in accordance with the invention. Thirteen frequency sub-bands are shown in the ordinate direction which, together make up the available transmission channel. Five out of the thirteen sub-bands, e.g., sub-bands 2, 3, 6, 9, and 12, specify on the frequency scale of the address of the intended receiver station. The position of the pulses on the time scale as shown on the abscissa simultaneously specifies the amplitude of the corresponding speech signal sample.

Returning momentarily to the transmitter N of FIG. 3 the address encoder 23 is arranged to distribute each code pulse from encoder 22 on $m$ out of $n$ sub-bands in accordance with the code of the intended message recipient. In practice the address code selector 24 is provided with a push button or dial arranged so that a subscriber may select the address according to a call designation, i.e., according to its "telephone number," as from a repertory of station call designations. He thus merely depresses the appropriate button or buttons or dials into storage the desired call designation. All pulses subsequently generated during the entire message are distributed on the appropriate frequency sub-bands for transmission. The selector may then be reactivated by a subscriber to designate the next call recipient at which time the previously stored address is automatically erased and the new one is recorded in its place.

Although apparatus for address coding the pulses from coder 22 may take a variety of forms one entirely suitable one is shown in FIG. 6. Code pulses applied to the input terminal 60 are applied in parallel to a plurality of paths; one path for each sub-band into which the channel is divided according to the desired address code. In the example of FIG. 6 thirteen parallel paths are required. Each channel includes a switch 61 in tandem with a band pass filter 62. The switches 61 perform the function of address code selector 24 in the apparatus of FIG. 2. In simplest terms the selector switches are closed in accordance with the desired code; only five of the thirteen switches are closed to specify the intended receiver. In well known fashion apparatus may be provided automatically to close the required combination of switches in response to a single manipulation by the subscriber, e.g., a form of repertory switching may be employed.

The filters 62 are individually proportioned on the frequency scale to pass one band of frequencies equal approximately to $1/n$ of the total channel bandwidths. Thus, filter 62–1 passes, for example, sub-band $f_1$ and filter 62–$n$ passes signals in sub-band $f_n$. Since applied pulses are relatively wide, the outputs of the filters are substantially equal in amplitude. In accordance with the address selected by switches 61, pulses are applied to the corresponding filters 62, and output terminal 66 is supplied with a plurality of pulses distributed on the frequency scale as shown in FIG. 5. The terminal 66 may be coupled directly to any desired form of apparatus for broadening the pulse durations, if required, and for broadcasting the pulse to the central repeater station for rebroadcasting, or to all receiver stations in the system directly.

The receiver apparatus contained in each of the substations may be identical with that contained in all of the others of the group with the exception of the feature associated with the identification of that substation, i.e., an identification of its address code or more explicitly its "telephone number." Ideally, only one (or a selected few) receiver stations responds to each nonsynchronously transmitted pulse group.

In the receiver apparatus 11 of FIG. 3 pulse modulated energy received on antenna 27, tuned to the common carrier frequency, is supplied by way of diplexer 26 to the receiver N. The received radio frequency energy may be reduced, if desired, to an intermediate frequency by conventional means, not shown. Received code pulse groups are supplied directly to an address code detector 28, the details of which will be described fully in connection with a discussion of FIG. 7, which is "tuned" to only one address code. Should the address code detector sense that a received code pulse group is intended for substation N it immediately closes the normally open gate 29 thus to pass the received code pulse group to code demodulator 30. If, to the contrary, the address code detector senses that the received code pulse group is not intended for receiver N the gate 29 remains in its normally open position, i.e., address decoder 28 does not energize it, and the receiver ignores entirely the code pulse group.

In a fashion well known in the art message signal information is recovered in demodulator 30. In the instant example the demodulator comprises any form of pulse code modulation discriminator. In accordance with the principles set forth in the aforementioned Pierce patent the erratically received pulse groups thus recovered are utilized to generate a replica of the speech signal produced at the transmitter station. The recovered speech signal is then passed through amplifier 31, if required, and to any desired utilization means, for example, loudspeaker 32.

Although all transmitted pulses are received simultaneously by all receivers, only that one for whom they are intended accepts them. Hence, the address decoder 28 of each receiver station effectively examines the received pulse groups for a multiple coincidence of the selected pulses $m$ which together designate the station. Only if coincidence is established is the pulse group allowed to pass through gate 29 to pulse code demodulator 30. Apparatus suitable for establishing the multiple coincidence of received pulses is shown by way of example in FIG. 7. It may be alike for all receiver stations with the parameters apportioned, of course, in accordance with the assigned station address. Received pulses transformed to an intermediate frequency, are applied to terminal 70 and in parallel to $m$ parallel paths, e.g., five paths for a five out of thirteen code. Each path contains typically a band pass filter 72 scaled to pass one of the selected sub-bands and detector apparatus 73 for extracting the energy in each pulse and transforming it into a base band signal. A rectifier may be used for this purpose. Unlike the address coder (FIG. 6) available at each transmitter station which requires one channel for each sub-band $n$, the address decoder at each receiver (FIG. 7) need have only $m$ paths, one for each channel comprising the address. A multiple coincidence of pulses in the $n$ channels is readily detected by passing the pulses supplied by rectifier 73 to a multiple AND gate 79 or the like, which may take any form well known in the art. An output signal appears at terminal 76 only if a pulse is simultaneously detected in each channel. A pulse passed by gate 79, which may if desired be the additive combination of all sub-channel pulses, is passed to a code pulse demodulator, e.g., demodulator 30 of FIG. 3.

To increase further the number of individual addresses that may be attributed to the code pulse groups to identify unequivocally their destinations, it is in accordance with another aspect of the invention to modify slightly the time relation which certain of the selected sub-band signals bear to the others. In addition, the use of two criteria, i.e., frequency domain selection and time domain modification, provides sufficient redundancy in the addressing of the groups that additional protection is provided against the acceptance of the pulse group by an unintended receiver or the non-acceptance of it by an intended station. Apparatus for performing the additional time delay coding and decoding may be, in large measure, similar to that illustrated in FIGS. 6 and 7.

Figures 7, 8, 9:
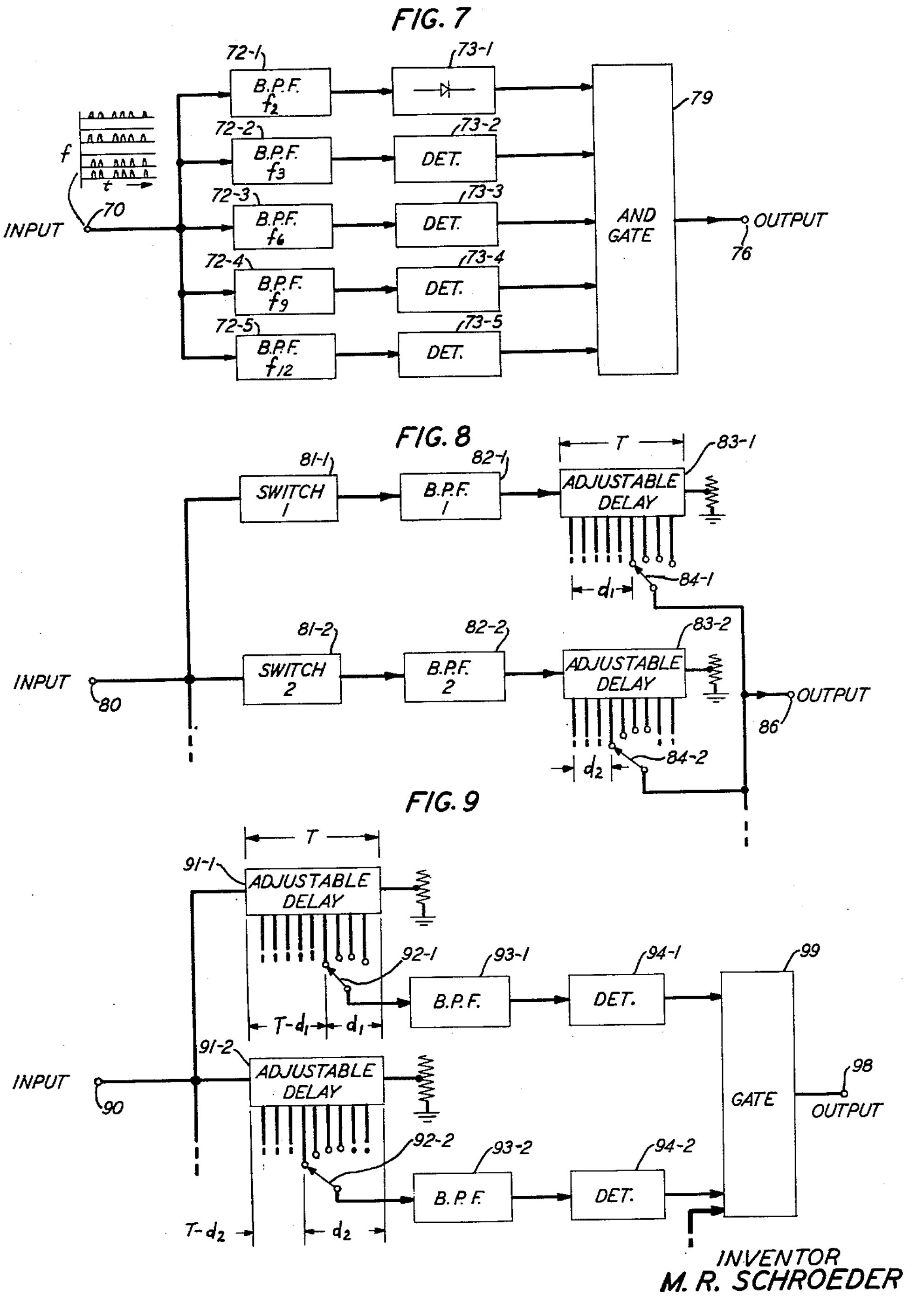
FIG. 7 is a schematic block diagram of address decoding apparatus suitable for use in receiver station apparatus embodying the principles of the invention.
FIG. 8 is a schematic block diagram of a refined alternative to the address encoding apparatus of FIG. 6.
FIG. 9 is a schematic block diagram of refined address decoding apparatus alternative to that of FIG. 7.

FIGS. 8 and 9 show for transmitter and receiver, respectively, the more refined address coding and decoding apparatus which may be employed in the practice of the invention. At the transmitter, uncoded pulses of suitable durations are applied to terminal 80 of the apparatus shown in FIG. 8, and passed by way of switches 81 to selected ones of the like parallel paths between terminals 80 and 86. Frequency sub-band division is introduced by band pass filters 82. The selected sub-band signals are individually subjected to selected intervals of delay in adjustable delay elements, one of which is connected in each of the parallel paths between terminals 80 and 86. The delay elements may be of any desired construction; in the drawing a tapped delay line 83 is shown which is suitably terminated at each end and provided with a number of taps at points spaced along its length. Each of the taps is brought to one of a number of contact points of a selector switch 84. The movable arm of the selector switch is connected to one of the taps in dependence on the degree of delay required in the corresponding frequency sub-band for the selected address. The delay elements of all channels are alike but, of course, are adjusted for different degrees of delay prior to the transmission of a message. In like fashion, the appropriate sub-bands are selected by manipulating switches 81.

The range of delay intervals for each sub-band may be arbitrarily chosen, for example, to lie in a range from zero delay to a delay of T seconds. Thus, in a typical address code, frequency sub-band $f_1$ may be utilized with a delay of $d_1$ where the interval $d_1$ is greater than zero and equal to or less than T; frequency sub-band $f_5$ may be utilized with the delay $d_5$; sub-band $f_9$ with delay $d_9$; and so on.

If some of the subscriber stations are to communicate only with a selected number of other substations, the address code for these stations may be arranged to have the same delay character for each of a selected number of sub-bands. Accordingly, the transmitter of the restricted operating station need not be provided with adjustable delay elements, but instead, delay elements of preselected magnitudes may be permanently built into all of the channels of the apparatus, e.g., delay $d_1$ for sub-bands $f_1$–$f_4$; $d_2$ for sub-bands $f_5$–$f_9$; $d_3$ for $f_{10}$–$f_{13}$; and so on. In this case only the selection of the appropriate frequency sub-bands is used to address the code pulse groups.

At the receiver station the apparatus shown in FIG. 9 may be employed to decode the address information. Selected frequency sub-band signals are received and applied to terminal 90 in parallel through a number of paths to coincidence gate 99. A delay element is included in each path such that the pulses passing through it are, in effect, advanced in time by a selected interval between zero and T seconds. Accordingly, each channel is provided with a delay element 91 proportioned to delay initially all applied signals by T seconds; i.e., to delay all pulses T seconds even although the particular delay assignment for that channel is zero. Hence, the entire sequence of received signals is eventually delayed by the period T seconds. For the frequency sub-bands in which pulses are delayed at the transmitter as a part of the address code, the selector arm 92 associated with the delay element 91 of that channel is adjusted to one of the taps on the delay line so that a delay $(T-d)$ only is encountered by received pulses. In effect, the pulses are advanced by the interval $d$ and hence are restored to their original relative positions on the time scale. Delay elements 91 may be identical to elements 83 utilized at the transmitter; they are suitably terminated at each end in the manner well known in the art.

The signals passed by delay element 91 and restored on the time scale to their original form pass through band pass filters 93 and detectors 94 and in a fashion identical with that previously described in connection with the apparatus of FIG. 7. Only if signals are detected in all paths is the multiple coincidence gate 99 closed to pass the composite signal to output terminal 98 and to the modulation decoder. Multiple coincidence in the apparatus of FIG. 9 depends, of course, upon a restoration of the signals received in the individual channels to time scale coincidence and the simultaneous detection of signals in all of the channels. Evidently a concurrence of both of these conditions for the receiver enablement is sufficient to minimize cross-talk and insure that successive code pulse groups are accepted only by the intended receiver.

Although in the foregoing descriptions the invention has been described with particular emphasis upon its use with pulse position or pulse frequency modulation cooling, it should be realized that in scope it is not limited to such modes of coding. Other desirable aspects of the invention will appear to those skilled in the art and suggested embodiments thereof which do not depart from the spirit and scope of this invention.

What is claimed is:

1. A transmitter for a multichannel intelligence transmission system comprising means controlled by a message wave to be transmitted for generating for each time spaced sample of said wave, a pulse group, one characteristic of said pulse group indicating the amplitude of the corresponding signal sample and another characteristic of said pulse group indicating the intended receiver of said pulse group, means for effectively widening each pulse of said group, and means for transmitting said modified pulse groups.

2. In a nonsynchronous time division multiplex transmission system a plurality of independent transmitter stations, each of said stations comprising a signal source, means for deriving erratically timed samples of said signal, means for generating for each sample one of a plurality of distinguishable code pulse groups each of which is distinguished from all of the other groups by virtue of a particular value assigned thereto which value identifies a corresponding one of a like plurality of receiver stations, means for modulating another characteristic of each pulse group of said plurality in accordance with the amplitude of the corresponding signal sample, means for modifying the duration of each pulse of said groups to a width that exceeds the impulse characteristic of the transmission medium, and means for transmitting said modulated pulse groups to said receiver stations over said medium.

3. In a nonsynchronous time division multiplex transmission system a plurality of independent transmitter stations, each of said stations comprising a signal source, means for deriving irregularly timed samples of said signal, means for generating for each sample one of a plurality of distinguishable code pulse groups each of which is distinguished from all of the other groups by virtue of a particular value assigned thereto which value identifies a corresponding one of a like plurality of receiver stations, means for modulating another characteristic of each pulse group of said plurality in accordance with the amplitude of the corresponding signal sample, means for modifying the width of each pulse of said groups to a width substantially greater than a convolution of the response of a said generated pulse with the impulse response of said medium, and means for transmitting said modulated pulse groups to said receiver stations over said medium.

4. A multichannel intelligence transmission and reception system comprising a plurality of independent transmitter stations, a plurality of independent receiver stations, and a common transmission medium, means for supplying message signals to said transmitter stations, means at each of said transmitter stations for deriving irregularly timed samples of said applied message signal, means for generating for each sample a pulse group, means for modulating a characteristic for each of said pulse groups in accordance with the amplitude of the corresponding sample, means for assigning each of said modulated code pulses to each of a selected plurality of frequency bands for transmission, the selected bands being uniquely identified with one of said plurality of receiver stations thus to distinguish the code pulse groups intended for one receiver station from all others, means for altering the duration of said modulated code pulses in all of said frequency bands to a width that substantially exceeds the impulse response of said transmission medium, means for transmitting said altered code pulses via said transmission medium to all of said receiver stations, and means at each of said receiver stations for accepting only said transmitted signals that are received simultaneously on a selected plurality of frequency bands.

5. A multichannel intelligence transmission and reception system comprising a plurality of independent transmitter stations, a plurality of independent receiver stations, and a common transmission medium, means for supplying message signals to said transmitter stations, means at each of said transmitter stations for deriving erratically timed samples of said applied message signal, means for generating for each sample a pulse group, means for modulating a characteristic for each of said pulse groups in accordance with the amplitude of the corresponding sample, means for assigning each of said modulated code pulses to a plurality of individual frequency bands for transmission, means for altering the relative time position of each of said pulses in said individual frequency bands by a selected identifiable time interval, the relative time position of all of said pulses in said frequency bands being uniquely identified with one of said plurality of receiver stations thus to distinguish code pulse groups intended for one receiver station from all others, means for altering the duration of said modulated code pulses in all of said frequency bands to a duration that substantially exceeds the impulse response of said transmission medium, means for transmitting said altered code pulses via said transmission medium to all of said receiver stations, and means at each of said receiver stations for accepting only said transmitted signals that are received with pre-established relative time position of pulses in said frequency bands.

6. A multichannel intelligence transmission and reception system comprising a plurality of independent transmitter stations, a plurality of independent receiver stations, and a common transmission medium, means for supplying a message signal to each one of said transmitter stations, means at each of said transmitter stations for deriving erratically timed samples of said applied signal, means for generating for each sample a pulse group, means for modulating a characteristic for each of said pulse groups in accordance with the amplitude of the corresponding sample, means for assigning each of said modulated code pulses to a preselected relative time interval in each of a selected group of frequency sub-bands for transmission, the relative time position of all of said pulses in said selected group of frequency sub-bands being uniquely identified with one of said plurality of receiver stations thus to distinguish the code pulse groups intended for one receiver from all others, means for altering the duration of said modulated code pulses in all of said frequency bands to a width that substantially exceeds the impulse response of said transmission medium, means for transmitting said altered code pulses via said transmission medium to all of said receiver stations, and means at each of said receiver stations for accepting only said transmitted signals that are received with a pre-established relative time position of pulses in a selected plurality of frequency sub-bands.

7. In a nonsynchronous time division multiplex telephone system, a plurality of independent transmitter stations, a plurality of independent receiver stations, each of said transmitter stations comprising a source of message signals, means supplied with a message signal from said source for deriving erratically timed samples of said message signal, means for generating for each of said samples a code group of pulses, means for modulating one characteristic of each of said code groups of pulses in accordance with the amplitude of said corresponding message sample, means for assigning each one of said modulated pulses to each one of a selected plurality of individual frequency bands for transmission, said plurality of individual frequency bands being selected from among a number of frequency bands according to a schedule thus uniquely to identify said pulses transmitted via said selected bands with one of said plurality of receiver stations only and to distinguish the code pulse groups assigned to said selected receiver station from code pulse groups intended for all others of said receiver stations, and means for simultaneously transmitting said coded pulse groups via all of said selected frequency bands to all of said plurality of receiver stations.

8. In a nonsynchronous time division multiplex telephone system, a plurality of independent transmitter stations, a plurality of independent receiver stations, each of said transmitter stations comprising a source of message signals, means supplied with a message signal from said source for deriving erratically timed samples of said message signal, means for generating for each of said samples a code group of pulses, means for modulating one characteristic of each of said code groups of pulses in accordance with the amplitude of said corresponding message sample, means for assigning each one of said modulated pulses to a preselected relative time interval in each one of a selected plurality of frequency bands for transmission, the relative time position of all of said pulses in all of said plurality of frequency bands being selected according to a first schedule, and the frequency bands of said plurality being selected from among a number of frequency bands according to a second schedule, the relative time intervals of said pulses and the plurality of frequency bands on which they are transmitted thus uniquely identifying said pulses with one of said plurality of receiver stations only and distinguishing said pulses from all other receiver stations, and means for simultaneously transmitting said coded pulse groups via all of said selected frequency bands to all of said plurality of receiver stations.

9. A pulse code transmission system comprising, a transmitter station and a number of receiver stations each separated from said transmitter station by a common transmission channel of prescribed bandwith, means at said transmitter station for generating for selected samples of a message wave supplied thereto a group of pulses whose intervals are substantially wider than the impulse response of said common transmission channel, means for altering one characteristic of said widened pulses to specify the amplitude of the corresponding message wave sample, means for altering another characteristic of said widened pulses to specify the single one of said receiver stations for which said group is intended, and means for transmitting said widened pulse groups to all of said receiver stations simultaneously on each one of a specified plurality of relatively narrow band channels selected from among a number of relatively narrow band channels which together have a bandwidth equivalent to the bandwidth prescribed for said common transmission channel.

References Cited in the file of this patent

UNITED STATES PATENTS

| | | |
|---|---|---|
| 2,425,066 | Labin et al. | Aug. 5, 1947 |
| 2,428,118 | Labin et al. | Sept. 30, 1947 |
| 2,498,678 | Grieg | Feb. 28, 1950 |
| 2,549,422 | Carbrey | Apr. 17, 1951 |
| 2,632,057 | Koenig | Mar. 17, 1953 |
| 2,635,228 | Purington | Apr. 14, 1953 |
| 2,664,462 | Bedford et al. | Dec. 29, 1953 |
| 2,676,202 | Filipowsky | Apr. 20, 1954 |
| 3,025,350 | Linder | Mar. 13, 1962 |